United States Patent [19]
Hall et al.

[11] 4,407,990
[45] Oct. 4, 1983

[54] ACRYLIC COATING COMPOSITIONS

[75] Inventors: Derrard M. Hall, Glen Waverley; Roy A. Kemp, Fernglen; Christopher H. Such, Mount Eliza, all of Australia

[73] Assignee: ICI Australia Limited, Melbourne, Australia

[21] Appl. No.: 348,088

[22] Filed: Feb. 11, 1982

[30] Foreign Application Priority Data

Feb. 13, 1981 [AU] Australia ................. PE7589

[51] Int. Cl.³ .............................................. C08L 1/14
[52] U.S. Cl. ........................................ 524/38; 524/39; 524/40; 427/142
[58] Field of Search ............... 524/27, 38, 39, 40; 427/140, 142; 156/94; 428/63; 106/178

[56]  References Cited
U.S. PATENT DOCUMENTS

| | | | |
|---|---|---|---|
| 2,849,409 | 8/1958 | Evans | 524/40 |
| 3,220,960 | 11/1965 | Wichterle | 526/303.1 |
| 3,429,840 | 2/1969 | Lowe, Jr. et al. | 524/38 |
| 3,637,546 | 1/1972 | Parker | 524/32 |
| 3,862,062 | 1/1975 | Harper | 524/40 |
| 3,862,063 | 1/1975 | Pettit, Jr. | 524/40 |
| 4,168,249 | 9/1979 | Meyer | 524/40 |
| 4,279,789 | 7/1981 | Lueddecke et al. | 524/40 |
| 4,314,044 | 2/1982 | Hughes et al. | 526/303.1 |

FOREIGN PATENT DOCUMENTS

| | | | |
|---|---|---|---|
| 62152/69 | 10/1969 | Australia | 524/40 |
| 29594 | 6/1981 | European Pat. Off. | 524/40 |
| 52-3632 | 1/1977 | Japan | 524/40 |

Primary Examiner—John Kight, III
Assistant Examiner—Nathan M. Nutter
Attorney, Agent, or Firm—Cushman, Darby and Cushman

[57] ABSTRACT

An acrylic coating composition suitable for use as an automotive refinish lacquer comprises a mixture of
(a) a solution in volatile organic solvent of an acrylic copolymer of 75–90% methyl methacrylate, 1.5–6.0% dimethylaminoethyl methacrylate and 8–23.5% of butyl acrylate, butyl methacrylate or lauryl methacrylate, the copolymer having a Tg of 80°–95° C.;
(b) a solution in volatile organic solvent of cellulose acetate butyrate, the cellulose acetate butyrate having a viscosity of 0.5–5 sec and a hydroxyl value of 2 maximum; and
(c) a monomeric ester plasticizer such that the non-volatile constituents of (a), (b) and (c) comprise respectively 43.5–64.0%, 15.0–25.5% and 21.0–31.5% of the total weight of non-volatile material of (a) plus (b) plus (c).

4 Claims, No Drawings

ACRYLIC COATING COMPOSITIONS

This invention relates to thermoplastic coating compositions and in particular to such compositions in which the principal film-forming ingredients are three-component blends of acrylic polymers, cellulose acetate butyrate and monomeric plasticiser.

According to the present invention we now provide a liquid coating composition comprising a mixture of
   (a) a solution in volatile organic liquid of a copolymer of from 75-90% methyl methacrylate, 1.5-4.0% dimethyl aminoethyl methacrylate and 8-23.5% of monomer selected from butyl methacrylate, butyl acrylate and lauryl methacrylate, which copolymer shall have a glass transition temperature of 80°-95° C.;
   (b) a solution in volatile organic liquid of cellulose acetate butyrate which has a viscosity of 0.5-5.0 sec when measured according to Test Method D1343 of the American Society for Testing and Materials, and a hydroxyl value of 2 maximum; and
   (c) a monomeric ester plasticiser compatible with the selected mixture of the said components (a) plus (b) such that the non-volatile constituents of (a), (b) and (c) comprise respectively 43.5-64.0%, 15.0-25.5% and 21.0-31.5% of the total weight of non-volatile material in (a) plus (b) plus (c).

We further provide a process of preparing a liquid coating composition by blending
   (d) a solution in volatile liquid solvent of a copolymer of from 75-90% methyl methacrylate, 1.5-4.0% dimethyl aminoethyl methacrylate and 8-23.5% of monomer selected from butyl methacrylate, butyl acrylate and lauryl methacrylate, which copolymer shall have a glass transition temperature of 80°-95° C.;
   (e) a solution in volatile liquid solvent of cellulose acetate butyrate which has a viscosity of 0.5-5.0 sec when measured according to Test Method D1343 of the American Society for Testing and Materials, and a hydroxyl value of 2 maximum; and
   (f) a monomeric ester plasticiser compatible with the selected mixture of the said components (d) plus (e) such that the non-volatile constituents of (d), (e) and (f) comprise respectively 43.5-64.0%, 15.0-25.5% and 21.0-31.5% of the total weight of non-volatile material in (d) plus (e) plus (f).

The compositions of this invention provide the principal film-forming components of liquid coating compositions, which are particularly suitable for use as automotive lacquers. Paint films deposited therefrom exhibit particularly useful combinations of hardness, flexibility, gloss and in particular, adhesion to other paint substrates.

The composition range of components which will confer these desirable properties is unusually narrow and to confer the optimum combination of hardness and adhesion for some uses we have found that it must be limited even further to the following preferred limits.

The preferred liquid coating composition comprises a mixture of
   (a) a solution in volatile organic liquid of a copolymer of from 75-80% methyl methacrylate, 2.5-3.5% dimethyl aminoethyl methacrylate and 15-20% butyl methacrylate, which shall have a glass transition temperature of 80°-95° C.

(b) a solution in volatile organic liquid of cellulose acetate butyrate which has a viscosity of 0.5-5.0 sec when measured according to Test Method D1343 of the American Society for Testing and Materials, and which has a hydroxyl value of 2 maximum; and
   (c) a compatible monomeric ester plasticiser selected from butyl benzyl phthalate and dipropylene glycol dibenzoate.

such that the non-volatile constituents of (a), (b) and (c) comprise respectively 43.5-64.0%, 15.0-25.5% and 21.0-31.5% of the total weight of non-volatile material in (a) plus (b) plus (c).

The preparation of component (a) is a conventional copolymerisation process which may be performed using standard polymerisation techniques. The glass transition temperature may be measured by using, for example a Differential Thermal Mechanical Analyser, but for the purpose of determining compliance with our invention, it is satisfactory to calculate the value from the known composition using published Tg values for homopolymers of the individual components.

As is usual with liquid coating composition, these will normally contain from 60-80% by weight of volatile solvent.

Pigments may also be incorporated in the coatings in conventional manner.

The invention is illustrated by the following examples, in which all components are expressed by weight:

EXAMPLE 1

Preparation of a coating composition according to the invention and comparative testing against a commercial lacquer not according to this invention.

An acrylic copolymer solution of the following composition was prepared by conventional addition polymerisation techniques:

| monomer composition | |
|---|---|
| methyl methacrylate | 83 parts |
| n-butyl methacrylate | 15 parts |
| dimethyl aminoethyl methacrylate | 2 parts |
| solids | 40% by weight |
| solvent composition | |
| methyl ethyl ketone | 30 parts |
| toluene | 70 parts |

132.5 parts of this solution was blended with 88 parts of a 25% (by weight) solution of cellulose acetate butyrate (0.5 second grade) in methyl ethyl ketone and toluene (30:70 by weight) and 25.0 parts of n-butyl benzyl phthalate, to give a solution of film-forming polymer wherein the non-volatile constituents of the copolymer solution, the cellulose acetate butyrate solution and the plasticiser comprised 53%, 22% and 25% of the weight of the total non-volatile content.

The solution so-prepared was pigmented to a pigment/binder ratio of 60 with titanium dioxide pigment to produce a white lacquer.

This lacquer was tested according to the methods outlined below. A commercial acrylic refinish lacquer having the same overall general composition but in which the acrylic polymer of this example was replaced with an equal weight, based on solids content, of a methyl methacrylate homopolymer was also tested according to these methods.

Adhesion test

The lacquer was thinned with the above mentioned solvent to a viscosity of 15–17 sec. in a Ford 4 viscosity cup and sprayed on to steel test panels coated with a baked, aged and lightly sanded film of commercial thermoset acrylic enamel. The film was dried in air for 24 hours and then subjected to the adhesion test of the American Society for Testing and Materials, test method D3359.

Heat distortion test

The lacquer was applied to a primed steel panel and the panel was spotted along its length with a 1% solution of egg albumen. The spots were allowed to dry overnight and the panel was then placed for 6 minutes on a thermal copper bar with a temperature gradient of from 35° C. to 65° C. between its ends. The panel was washed and inspected for distortion resistance, the temperature to which each albumen spot was heated being easily determined by its position on the bar. A coating composition is considered to have acceptable distortion resistance if only those spots corresponding to temperatures above about 40° C. show signs of distortion.

Recoat craze test

The lacquer was applied to a primed steel panel, allowed to air dry and aged in an oven at 65° C. for 16 hours. The panel was then cooled to 25° C. and a 175 μm film of the lacquer (thinned to spraying viscosity) was drawn down. The film was allowed to dry and examined for crazing (a network of fine interconnecting cracks on the surface of the dry film). The panel was returned to the oven for seven days after which it was again withdrawn, cooled to 25° C. and the above mentioned procedure repeated. The panel and the thinned lacquer used for the draw-downs were then cooled to 7° C. and a third film drawn down, allowed to dry and examined for crazing.

Both lacquers performed satisfactorily in the heat distortion and recoat craze test but whereas the lacquer prepared according to the invention exhibited almost no loss of adhesion in the adhesion test, the commercial lacquer exhibited very poor adhesion.

EXAMPLE 2

Use of a number of different acrylic polymers.

A number of coating compositions was prepared according to Example 1 but in each case the copolymer in that example was replaced by one of the following copolymers;

(a) methyl methacrylate (87%), n-butylmethacrylate (10%), dimethylaminoethylmethacrylate (DMAEMA) (3%).

(b) methyl methacrylate (90%), ethylacrylate (8%), DMAEMA (2%);

(c) methyl methacrylate (95%), n-butyl methacrylate (3%), DMAEMA (2%)

where (a) is according to the invention, (b) includes a monomer which is not according to the invention and (c) has proportions of comonomers which lie outside the permitted limits.

The coating compositions thus prepared were subjected to the testing procedures of Example 1. The composition (a) gave good results in all tests whereas the composition (b) performed poorly in the adhesion and heat distortion tests and the composition (c) in the adhesion and recoat craze test.

EXAMPLE 3

Effect of changing the proportions of the components of the coating composition.

Example 1 was repeated but the proportions of the components were altered such that the ratio of copolymer/cellulose acetate butyrate/plasticiser was 69/6/25 instead of the 52/22/25 ratio of that example. When subjected to the testing procedures outlined in Example 1 the resultant coating composition exhibited unacceptable recoat crazing.

EXAMPLE 4

Use of various types of cellulose acetate butyrate (CAB).

Example 1 was repeated twice, in each case replacing the CAB of that example by an identical quantity of (a) a CAB whose hydroxyl value was 3; and (b) a CAB whose viscosity was 0.2 sec.

When tested by the procedures outlined in Example 1, the composition containing (a) exhibited poor adhesion and that containing (b) poor recoat crazing resistance. Prior to testing, it was also noticeable that each composition had poor gloss when compared to the composition of Example 1.

EXAMPLE 5

Use of various plasticisers.

Example 1 was repeated, replacing the butyl benzyl phthalate plasticiser of that example by an identical quantity of (a) dipropylene glycol dibenzoate (b) "Santiciser" 141 (trade mark) ex Monsanto Co.—a commercially available monomeric plasticiser (c) 34% coconut glycerol alkyd resin (d) saturated neo-pentylglycol-adipic acid polyester.

The compositions containing (a) and (b) performed satisfactorily when tested according to the procedures of Example 1 but those containing (c) and (d) exhibited poor adhesion.

We claim:

1. A liquid coating composition comprising a mixture of (a) a solution in volatile organic liquid of a copolymer of from 75–90% methyl methacrylate, 1.5–4.0% dimethyl aminoethyl methacrylate and 8–23.5% of monomer selected from butyl methacrylate, butyl acrylate and lauryl methacrylate, which copolymer shall have a glass transition temperature of 80°–95° C.;

(b) a solution in volatile organic liquid of cellulose acetate butyrate which has a viscosity of 0.5–5.0 sec when measured according to Test Method D1343 of the American Society for Testing and Materials, and a hydroxyl value of 2 maximum; and (c) a monomeric ester plasticiser compatible with the selected mixture of the said components (a) plus (b) such that the non-volatile constituents of (a), (b) and (c) comprise respectively 43.5–64.0%, 15.0–25.5% and 21.0–31.5% of the total weight of non-volatile material of (a) plus (b) plus (c).

2. A liquid coating composition according to claim 1 wherein the copolymer (a) comprises 75–80% methyl methacrylate, 2.5–3.5% dimethylaminoethyl methacrylate and 1.5–2.5% butyl methacrylate; and the monomeric ester plasticiser (c) is selected from butyl benzyl phthalate and dipropylene glycol dibenzoate.

3. A process of preparing a liquid coating composition by blending
(d) a solution in volatile liquid solvent of a copolymer of from 75-90% methyl methacrylate, 1.5-4.0% dimethyl aminoethyl methacrylate and 8-23.5% of monomer selected from butyl methacrylate, butyl acrylate and lauryl methacrylate, which copolymer shall have a glass transition temperature of 80°-95° C.;
(e) a solution in volatile liquid solvent of cellulose acetate butyrate which has a viscosity of 0.5-5.0 sec when measured according to Test Method D1343 of the American Society for Testing and Materials, and a hydroxyl value of 2 maximum; and
(f) a monomeric ester plasticiser compatible with the selected mixture of the said components (d) plus (e) such that the non-volatile constituents of (d), (e) and (f) comprise respectively 43.5-64.0%, 15.0-25.5% and 21.0-31.5% of the total weight of non-volatile material of (d) plus (e) plus (f).

4. A process according to claim 3 wherein
(d) the copolymer comprises 75-80% methyl methacrylate, 2.5-3.5% dimethylaminoethyl methacrylate and 1.5-20% butyl methacrylate; and
(f) the monomeric ester plasticiser is selected from butyl benzyl phthalate and dipropylene glycol dibenzoate.

* * * * *

UNITED STATES PATENT OFFICE
CERTIFICATE OF CORRECTION

Patent No. 4,407,990  Dated October 4, 1983

Inventor(s) Derrard M. HALL, et al

It is certified that error appears in the above-identified patent and that said Letters Patent are hereby corrected as shown below:

Cover page, item [73] is changed to read "Assignee: Dulux Australia LTD."

Signed and Sealed this

Thirty-first Day of January 1984

[SEAL]

Attest:

Attesting Officer

GERALD J. MOSSINGHOFF

Commissioner of Patents and Trademarks